Patented Mar. 9, 1948

2,437,293

UNITED STATES PATENT OFFICE 2,437,293

EMULSIONS CONTAINING A DRYING OIL-ESTER RESIN COPOLYMER

William H. Butler, Bloomfield, N. J., assignor to Bakelite Corporation, a corporation of New Jersey No Drawing. Application May 29, 1943, Serial No. 489,063

7 Claims. (Cl. 260—6)

This invention relates to coating compositions of the emulsion type. These are essentially two-phase systems, and commonly the disperse phase is an oil and resin composition and the continuous phase is water; the phases, however, may be reversed.

In a copending application Serial No. 351,235 filed August 3, 1940, which has since become Patent 2,397,240, March 26, 1946, there are disclosed ester resins prepared from an adduct of maleic acid or anhydride and cyclopentadiene, a polyhydric alcohol and as a third reactant a monobasic fatty acid isolated from a vegetable or fish oil and having from 5 to 22 carbon atoms in the chain such as caproic, lauric, myristic, hypogaeic, palmitic, stearic, lincanic, eleostearic, clupadonic, oleic, linolic, linoleic, etc., or a partial esterification product, such as a mono- or diglyceride of the acid. These ester resins differ markedly from glycerol mixed esters of phthalic anhydride and monobasic acids in their behavior with fatty drying oils in that upon heating they react or copolymerize with the oils to form compounds. Such compounds of oil and ester resin have been found particularly useful in the form of emulsions for the production of clear or pigmented films, or as saturants or as bonds; and it is to this portion of the disclosure of the copending application that the present application is directed as a continuation-in-part.

In brief the disclosure of the copending application comprehends a two-step reaction:

(1) The primary polyhydric alcohol ester formation of the cyclopentadiene adduct of maleic acid together with a monobasic acid; these esters are low polymer products, and characteristic of them is the property of cross-linking with sulfur to produce flexible, insoluble gels.

(2) The coupling of the low polymer ester with film-forming vehicles by heat-processing into copolymers; in this step the ester resin loses its identity, and a wide range of copolymers is possible with conjugated or non-conjugated unsaturated drying oils, such as linseed, soya bean, fish, etc., which copolymers are characterized by a rapidity of drying and polymerization that may exceed that of tung oil and have improved chemical and water resistance and stability to oxygen at elevated temperatures. For instance polymerization to a solid gel at 250° C. of a 2.5 gram sample in a test tube of (a) Ester resin alone required 18 minutes;
(b) 1 part resin and 2 parts tung oil required 10 minutes;
(c) Tung oil alone required 27.5 minutes.

The copolymer of resin and oil had almost twice the polymerization speed of the resin alone and almost three times that of the tung oil alone. Using linseed oil heat-processed to a body Q, polymerization at 585° F. reached a viscosity of 148 poises with (d) Oil alone in 235 minutes;
(e) 1 part resin and 5 parts oil in 33 minutes;
(f) 1 part resin and 4 parts oil in 7 minutes;

showing that 15 per cent of resin in the composition accelerated the polymerization about 7 times and 20 per cent of resin accelerated the polymerization over 30 times.

Water paints, depending on the evaporation of water to leave a continuous film or coating have a number of advantages, among them being the absence of organic solvents or thinners and consequent freedom from odor, rapid drying, adhesion to porous and damp surfaces, etc. Those water paints based on water-soluble colloids as casein, soya bean protein, etc. have poor water resistance and durability, they have a tendency to shrink and scale, and they are objectionable otherwise; the more durable types are those based on casein or soya bean protein dispersed by alkali or borax and modified with drying oils or other water-insoluble film components.

A number of factors influence emulsions, their preparation and properties. For instance, the oil-resin composition, or the film-forming component of the emulsion which constitutes the vehicle for pigments and other fillers incorporated therewith, must needs be one that forms a stable emulsion of either the oil-in-water or the water-in-oil type and one that can stand reduction with water without breaking in the brush when applied. The viscosity of the vehicle affects both the dispersion and particle size of the disperse phase; and the vehicle also must tolerate emulsifying agents or compounds having on one end of the molecule non-polar groups soluble in the vehicle, such as fatty acids, and on the other end polar groups soluble in the water phase, such as are provided by morpholine, ethylene diamine and other amines or ammonia. To hold the vehicle as the dispersed phase in water a water-soluble colloid is required, but for stability the colloid should not be in amount to injuriously affect the water resistance or durability of the film. In addition there is the consideration of package-stability on aging and on exposure to a wide range of temperatures.

The copolymer oil-ester resin compositions of the above mentioned copending application have been found to be particularly useful vehicles in emulsions. Preferably the vehicles are short oil (8-30 gallon) compositions with the resin constituting from 30 to 60 per cent by weight of the compositions and with a viscosity ranging from 60 poises to 300 poises; such vehicles are readily dispersed in water to form stable emulsions reducible with water. They yield durable, adherent water-resistant films upon application, with the outstanding advantage of non-absorption on porous surfaces to give single coats of high hiding properties.

*Example 1.*—A stable emulsion of the oil-in-water type which air-dries rapidly and yields a continuous film on evaporation of the water was made as follows: A mixture of predominantly monoglycerides of the unsaturated linseed oil fatty acids was prepared from 49.16 parts of linseed oil, 10.88 parts of glycerine, and .08 part of litharge by running to 220° C. and holding at that temperature for 20 minutes. With the mixture were reacted 35.37 parts of the cyclopentadiene adduct of maleic anhydride and 4.51 parts of glycerine, the reaction being held at a temperature of about 200° C. to form an ester resin with an acid value of 45 to 60 and viscosity of about 8 poises when reduced with toluol in the proportion of 3 resin to 1 toluol. The ester resin so made polymerized upon air-drying to a hard, solvent-resistant, flexible coating, and at 250° C. it polymerized to a solid in 18 minutes; the resin at a viscosity of 12 poises (toluol solution) was readily compatible with drying oils at room temperature, and oil-solubility did not become critical until reacted to a viscosity of about 50 poises (toluol solution). In the preparation of the ester resin the proportion of monobasic fatty acid included as a reactant is subject to wide variation; but preferably there is included such an amount that the substantially unpolymerized or low molecular weight ester has a viscosity ranging from about 2.5 to 12 poises when reduced with toluol in the proportion stated.

100 pounds of the ester resin were reacted with eight gallons of alkali-refined linseed oil at 400° F. for a period of 5 hours. On cooling, the reaction product (not in solution) had an acid number of 13.3 and a viscosity of 135 poises.

For preparing the emulsion, 150 pounds of casein were dispersed in 850 parts of water with the aid of nine pounds of ammonium hydroxide (28% NH3) by heating to 160°-170° F. and holding for 30 minutes; 3 pounds of pine oil were added as a preservative. 74.3 pounds of the casein solution containing 15 per cent solids were blended with 100 pounds of water and three pounds of ammonium hydroxide. To this solution was then added slowly with agitation 100 pounds of the oil and ester resin reaction product and two pounds of fatty acids. The resulting emulsion was an oil-in-water type which could be reduced with water to infinite dilution. The emulsion was quite stable and withstood alternate freezing and heating to 160° F. without breaking. For air-drying application, 1 per cent cobalt linoleate can be blended with the emulsion to accelerate drying.

*Example 2.*—100 pounds of the ester resin of the foregoing example were reacted with 30 gallons of soya bean oil by first adding the resin to 12.5 gallons of soya bean oil, running the mixture to 500° F. in 45 minutes, and holding for 10 minutes at 500° F. The balance of the soya bean oil was then added, run to 540° F. and held for 1.25 hours. It was then cooled to 400° F. and held at this temperature until it reached a viscosity of Z4 (on the Gardner-Holdt scale). The final product had an acid number of 6.5 and viscosity of Z4. An emulsion was prepared as in Example 1.

The oil-ester resin reaction product yields a very flexible, water-resistant coating. The emulsion can be used as a sizing coat or barrier coat on fabric, or for interior or exterior protective coatings, either clear or pigmented.

*Example 3.*—A pigmented coating composition was made as follows:

| | Pounds |
|---|---|
| Titanium dioxide (rutile) | 350 |
| China clay | 300 |
| Resin emulsion, Example 1 (40% solids) | 500 |
| Water | 145 |
| Cobalt linoleate liquid | 2 |

The pigment was ground in the emulsion by roller milling.

For application the composition is reduced in the proportion of one gallon of paint to 0.5 gallon of water. This paint air-dries to a dry surface in 15 minutes and a firm film on an overnight dry. The pigmented emulsion when applied on a primed metal base showed only slight chalking at the end of 2000 hours in the National accelerated weathering machine, while a paint based on a modified casein showed complete failure at the end of 300 hours in the same test. As a traffic paint on cement and asphalt, excellent service was obtained over a nine months period, and the ester resin emulsion was found more serviceable than the solvent base traffic paints in common use.

*Example 4.*—A very fast, hard drying, continuous film for application on paper containers, metal, etc., was made by heat-processing for a period of 15 minutes at 500° F., 50 pounds of the ester resin of Example 1 with 50 pounds of a phenol resin modified with ester gum and having a melting point of 270° F.; the mass was cooled and reduced with 25 pounds of xylol. 125 pounds of this partially polymerized ester resin solution was made into an emulsion as in Example 1. The emulsion on air-drying yielded a fairly dry film upon an air-drying for three to five minutes; the film was glossy and continuous. The emulsion is especially applicable, either clear or pigmented, for use as a surface coating for paper to improve wet strength, or as a fast-drying, pigmented vehicle.

The emulsions of Example 1 or Example 4 can be used for saturating paper to increase the wet strength, water resistance and wet rigidity. The emulsion of Example 2 can be used as a barrier coat on fabric for the subsequent application of other finishes or for the purpose of preventing saturation of the fibers; when used as a barrier coat, the water should be reduced and the emulsion in a very viscous condition should be knife-coated on the fabric. The pigmented emulsion described in Example 3 can be applied on cement, plaster, over aged paint films, and on metal; the coating will adhere to these surfaces without scaling or loss of adhesion. When the modified casein paste paints are applied over aged paint films, they show poor adhesion, and this is due to the surface shrinkage of the colloid; but as only 10 per cent of casein is used with the ester resin reaction product, the film dries essentially by polymerization and surface shrinkage does not occur.

Other colloids such as soya bean protein, water-soluble cellulose, ammonium alginate, etc., can be used as stabilizers in place of casein. The amount of colloid added preferably ranges from about 5 to 20 per cent based on the weight of the oil-ester resin composition; below 5 per cent the stability of the emulsion is poor, and above 20 per cent the film shows appreciable loss in water resistance.

What is claimed is:

1. Aqueous emulsion comprising as an essential ingredient a copolymerization product of a drying oil with an ester obtained in reacting a cyclopentadiene-maleic adduct, a fatty acid having from 5 to 22 carbon atoms in the chain and a polyhydric alcohol.

2. Emulsion comprising water, a stabilizer, and a copolymerization product of a drying oil with an ester obtained in reacting a cyclopentadiene-maleic adduct, a fatty acid having from 5 to 22 carbon atoms in the chain and a polyhydric alcohol.

3. Emulsion including water, casein as a stabilizer, and a copolymerization product of a drying oil with an ester obtained in reacting a cyclopentadiene-maleic adduct, a fatty acid having from 5 to 22 carbon atoms in the chain and a polyhydric alcohol.

4. Emulsion comprising water, a stabilizer, and a copolymerization product of a drying oil with an ester obtained in reacting a cyclopentadiene-maleic adduct, a fatty acid having from 5 to 22 carbon atoms in the chain and a polyhydric alcohol, the stabilizer constituting from 5 to 20 per cent based on the weight of the reaction product.

5. Emulsion comprising water, a stabilizer and a copolymerization product of a drying oil with an ester obtained in reacting a cyclopentadiene-maleic adduct, a fatty acid having from 5 to 22 carbon atoms in the chain and glycerol, said ester constituting from 30 to 60 per cent of the copolymerization product and said product having a viscosity ranging from 60 to 300 poises.

6. Emulsion comprising water, a copolymerization product of a drying oil with an ester obtained in reacting a cyclopentadiene-maleic adduct, a fatty acid having from 5 to 22 carbon atoms in the chain, and glycerol, said ester when reduced with toluol in the proportion of 3 parts of the product to one part of toluol having a viscosity of from about 2.5 to 12 poises, and an emulsifying agent having on one end of the molecule a non-polar group soluble in the product and on the other end a polar group soluble in the water.

7. Emulsion comprising water and a vehicle dispersed therein comprising a copolymerization product of a drying oil with an ester obtained in reacting a cyclopentadiene-maleic adduct, a fatty acid having from 5 to 22 carbon atoms in the chain and glycerol, the ester constituting from 30 to 60 per cent by weight of the vehicle and the vehicle having a viscosity ranging from 60 to 300 poises.

WILLIAM H. BUTLER.

REFERENCES CITED

The following references are of record in the file of this patent:

UNITED STATES PATENTS

| Number | Name | Date |
| --- | --- | --- |
| 2,178,474 | Frick | Oct. 31, 1939 |
| 2,251,297 | Soday | Aug. 5, 1941 |
| 2,272,057 | Cheetham | Feb. 3, 1942 |

OTHER REFERENCES

Pages 835, 884 and 895, Chemistry of Synthetic Resins, by Ellis, vol. II, 1935.